(12) United States Patent
Chauvin et al.

(10) Patent No.: US 9,573,705 B2
(45) Date of Patent: Feb. 21, 2017

(54) METHOD AND SYSTEM FOR BLOWING AND FILLING LIGHTWEIGHT CONTAINERS

(71) Applicant: NESTEC S.A., Vevey (CH)

(72) Inventors: Guillaume Chauvin, Singapore (SG); Damien Kannengiesser, Golbey (FR); Johannes Zimmer, Saarbruecken (DE)

(73) Assignee: DISCMA AG, Hunenberg (CH)

( * ) Notice: Subject to any disclaimer, the term of this patent is extended or adjusted under 35 U.S.C. 154(b) by 221 days.

(21) Appl. No.: 14/367,696

(22) PCT Filed: Nov. 28, 2012

(86) PCT No.: PCT/EP2012/073851
§ 371 (c)(1),
(2) Date: Jun. 20, 2014

(87) PCT Pub. No.: WO2013/092146
PCT Pub. Date: Jun. 27, 2013

(65) Prior Publication Data
US 2014/0305081 A1    Oct. 16, 2014

(30) Foreign Application Priority Data
Dec. 21, 2011   (EP) ..................................... 11194794

(51) Int. Cl.
| | | |
|---|---|---|
| *B65B 3/02* | (2006.01) | |
| *B29C 49/10* | (2006.01) | |
| *B29C 49/46* | (2006.01) | |
| *B29C 49/78* | (2006.01) | |
| *B29L 31/00* | (2006.01) | |
| *B29K 67/00* | (2006.01) | |

(52) U.S. Cl.
CPC ............... *B65B 3/022* (2013.01); *B29C 49/10* (2013.01); *B29C 49/46* (2013.01); *B29C 49/783* (2013.01); *B29C 2049/4664* (2013.01); *B29K 2067/003* (2013.01); *B29L 2031/7158* (2013.01)

(58) Field of Classification Search
None
See application file for complete search history.

(56) References Cited

U.S. PATENT DOCUMENTS

2009/0218733 A1* 9/2009 Andison ................ B29C 49/46
264/525

FOREIGN PATENT DOCUMENTS

| | | |
|---|---|---|
| DE | 102004014653 | 10/2005 |
| EP | 2143543 | 1/2010 |
| FR | 2839277 | 11/2003 |
| FR | 2848906 | 6/2004 |

* cited by examiner

*Primary Examiner* — Monica Huson
(74) *Attorney, Agent, or Firm* — Eric J. Sosenko; Jonathan P. O'Brien; Honigman Miller Schwartz and Cohn LLP (57) ABSTRACT

The invention concerns a method of blowing and filling a container from a thermoplastic polymer preform, comprising: stretching a thermoplastic polymer preform (16) placed within a mould (12) during a stretching phase, starting an injection phase for injecting a liquid into the preform, the injection phase starting after the stretching phase has started, characterized in that prior to starting the injection phase the liquid is at a predetermined pressure above the atmospheric pressure.

15 Claims, 5 Drawing Sheets

METHOD AND SYSTEM FOR BLOWING AND FILLING LIGHTWEIGHT CONTAINERS

CROSS REFERENCE TO RELATED APPLICATIONS

The present application is a National Stage of International Application No. PCT/EP2012/073851, filed on Nov. 28, 2012, which claims priority to European Patent Application No. 11194794.1, filed Dec. 21, 2011, the entire contents of which are being incorporated herein by reference.

FIELD OF THE INVENTION

The invention relates to a method of blowing and filling containers from thermoplastic polymer preforms.

BACKGROUND

Plastic containers such as bottles of water are manufactured and filled according to different methods including blow moulding or stretch-blow moulding.

According to one of these known methods a plastic preform is first manufactured through a moulding process and then heated before being positioned inside a blowing mould.

The preform usually takes the form of a cylindrical tube closed at its bottom end and open at its opposite end.

Once the preform has been positioned within the mould only the open end of the preform is visible from above the mould.

This method makes use of a stretch rod which is downwardly engaged into the open end of the preform so as to abut against the closed bottom end thereof. The stretch rod is further actuated to be urged against the closed end, thereby resulting in stretching the preform.

After the stretching phase has been initiated a liquid is also injected into the preform through its open end as disclosed for instance in Applicant's patent EP 1 529 620 B1. This liquid injection causes expansion of the preform until coming into contact with the inner walls of the mould, thereby achieving the final shape of the bottle.

The Applicant has noted that in some cases the above-mentioned method may lead to breaking of thermoplastic polymer preforms during the stretching and injection phases.

There is therefore a need for a method and a system enabling simultaneous blowing and filling of a thermoplastic polymer container without damaging the latter or, at least, while reducing the risks of damaging it.

SUMMARY OF THE INVENTION

With the foregoing in mind the Applicant has discovered that having the liquid at a predetermined pressure above the atmospheric pressure is novel and inventive and is a part of the solution to the above-mentioned problem.

More particularly, prior to starting the injection phase the method comprises bringing the liquid to a predetermined pressure above the atmospheric pressure so that the thus pressurized or pre-loaded liquid is ready to be injected.

The Applicant has noticed that when the liquid is being brought to a predetermined pressure above the atmospheric pressure energy is being produced.

Storage of this energy created through pressurizing the liquid or, at least a fraction thereof, may further contribute to solving in part the above-mentioned problem.

More particularly, the Applicant has discovered that prior storage of at least a fraction of this energy makes it possible to subsequently release/recover the stored energy and use it when starting the injection phase.

The injection phase will thus be powered in part when releasing the stored energy.

When starting the injection phase, the pressurized liquid is being pushed under the release of the stored energy so as to be injected more rapidly into the preform.

Energy recovery or restitution at the injection phase start enables fast filling and expansion of the preform.

The expansion is thereby performed in a more efficient and controlled manner.

The temperature of the preform remains at a sufficiently high value which therefore reduces the risks of damaging the preform during its fast expansion.

Acceleration of the manufacturing process may therefore be obtained.

Storage of energy produced through pressurizing the liquid in a liquid circuit may be achieved thanks to different ways.

For example, air may be added to the liquid (e.g. water) in the circuit and therefore compressed during the pressurization of the liquid. The energy contained in the compressed air will therefore be recovered through expansion of compressed air when starting the injection phase.

Also, at least one part of the liquid circuit (flexible pipe or membrane, expansion tank, etc.) may be elastically deformable so that energy produced through pressurizing the liquid contributes to elastically deforming said at least one part when submitted to said increase in pressure. The elastically deformed part stores at least in part the energy produced and restitutes it when releasing the pressurized liquid at the start of the injection phase. This imparts velocity and energy to the pressurized liquid which enables acceleration of the introduction of liquid into the preform and, therefore, acceleration of the whole manufacturing process.

The Applicant has noticed that lightweight thermoplastic preforms were more likely to break during the stretching and injection phases.

By way of example, a thermoplastic container such as a bottle weighting 12 g, having a volume of 0.51 and a neck of the type 25/29 is considered as a lightweight container and cannot be successfully manufactured through the above-mentioned prior art method.

The method according to the invention suitably applies to lightweight thermoplastic polymer preforms.

When pressurizing the liquid prior to starting the liquid injection phase, storing at least in part energy produced during the liquid pressurization and using the stored energy at the start of the injection phase, the method enables simultaneous blowing and filling of a lightweight thermoplastic polymer container (e.g. a bottle) while dramatically reducing the risk of damaging the latter.

According to a possible feature, the predetermined pressure is greater than 0 and less than or equal to 40 bars.

According to a possible feature, the predetermined pressure is greater than 0 and less than or equal to 15 bars when the thermoplastic polymer is PET.

The predetermined pressure to be reached by the liquid may be chosen in accordance with the preform.

The value of the predetermined pressure may be adjusted through trials and experiments within reach for the skilled person so as to avoid breaking the preform during the injection.

According to a possible feature, the method comprises opening a valve device in a liquid injection circuit so as to release the pressurized liquid in the circuit and enable its injection into the preform, the pressurized liquid being at said predetermined pressure upstream of said valve device before its opening.

Thus, the liquid, e.g., at rest, that is to be injected is already pressurized before the injection phase has started and the liquid has been put into circulation within the liquid injection circuit.

When energy has been stored during the liquid pressurization (the energy has been stored in the part of the circuit that is located upstream of the valve device), as soon as the valve has been opened the liquid that is released in the liquid injection circuit has already a relatively high velocity due to the release of the stored energy. This velocity enables acceleration of the liquid introduction into the preform and, therefore, of the whole manufacturing process.

According to another possible feature, the method further comprises capping the blown and filled container that has been filled with the liquid injected in the preform.

Thus, the whole manufacturing process proves to be even more efficient and rapid when the injected liquid is the liquid that will be enclosed in the closed container to be subsequently put in the commerce.

The invention also provides for a system as defined in claim 8.

This system has the same advantages as those mentioned above in connection with the method. It is also a part of the solution to the above-mentioned problem.

According to a possible feature, the system comprises means for bringing the liquid to said predetermined pressure above the atmospheric pressure.

According to a more specific feature, said means for bringing the liquid to said predetermined pressure above the atmospheric pressure comprise at least one of the following means:
 a piston/cylinder device,
 a pump device.

Each of these pressurizing means may be connected upstream of the injection means.

According to a possible feature, said means for bringing the liquid to said predetermined pressure above the atmospheric pressure comprise a piston/cylinder device and a pump device connected thereto.

Both devices are suitable for cooperatively operating so as to efficiently inject the liquid into the preform. Two different operating ways may be envisaged.

Firstly, the pump device provides the liquid (e.g. water) and takes care of the liquid pressure prior to and during the forming of the container (injection phase). The role of the piston device is to provide the pressure of liquid at the end of the forming process, in particular, for ensuring appropriate printing of the details on the outside surface of the container.

Secondly, in an alternative operating way, the pump device provides liquid (e.g. water) to fill the piston device and the latter takes care of everything: building up the liquid pressure prior to forming the container and providing the pressure during and after the filling of the container.

According to a possible feature, the system comprises means for storing energy produced when bringing the liquid to said predetermined pressure above the atmospheric pressure.

Such means or device may further contribute to solving in part the above-mentioned problem.

This is because these means or device make it possible to use the stored energy during the injection phase.

Use of this energy will enable fast filling (liquid injection) and expansion of the preform, thereby reducing the risk of damaging the latter.

In this respect, the system may comprise means for releasing the stored energy which are activated to release the latter when the injection means are caused to inject the pressurized liquid into the preform.

Thus, at the start of the injection phase, the energy stored is recovered and used in order to contribute to powering the injection phase.

According to a possible feature, the energy storing means comprise at least one of the following in the liquid circuit in which the liquid is brought to said predetermined pressure:
 presence of air,
 at lease one deformable part that is elastically-deformable when submitted to said predetermined pressure so as to store energy.

It is to be noted that these means are particularly simple and may be combined in some instances.

According to a possible feature, the predetermined pressure is greater than 0 and less than or equal to 40 bars.

More specifically, the predetermined pressure may be greater than 0 and less than or equal to 15 bars when the thermoplastic polymer is PET.

According to another possible feature, the system comprises:
 a liquid injection circuit for injecting the liquid into the preform,
 a valve device (or a similar device performing the same function) that is located upstream of said liquid injection circuit, said valve device enabling holding of the liquid at said predetermined pressure above the atmospheric pressure and ready to be injected when closed, and, release of the pressurized liquid in the liquid injection circuit for injection into the preform when open.

The liquid at rest is under a predetermined pressure upstream of the valve device.

It is to be noted that when energy is stored in the part of the circuit that is upstream of the valve device, this energy is being kept stored while the valve device is kept closed. When the valve device is activated to be opened the stored energy is released and pushes the liquid into the liquid injection circuit.

Thus, even after opening the valve device the pressure of the liquid circulating in the liquid injection circuit will remain at a sufficiently high value when being introduced into the preform despite of the decrease in pressure at the opening of the valve device.

As the injection of liquid is carried out more rapidly the impact of the response times of all the components in the system on the performance of the method is lessened.

DESCRIPTION OF THE PREFERRED EMBODIMENT

Figure 1:
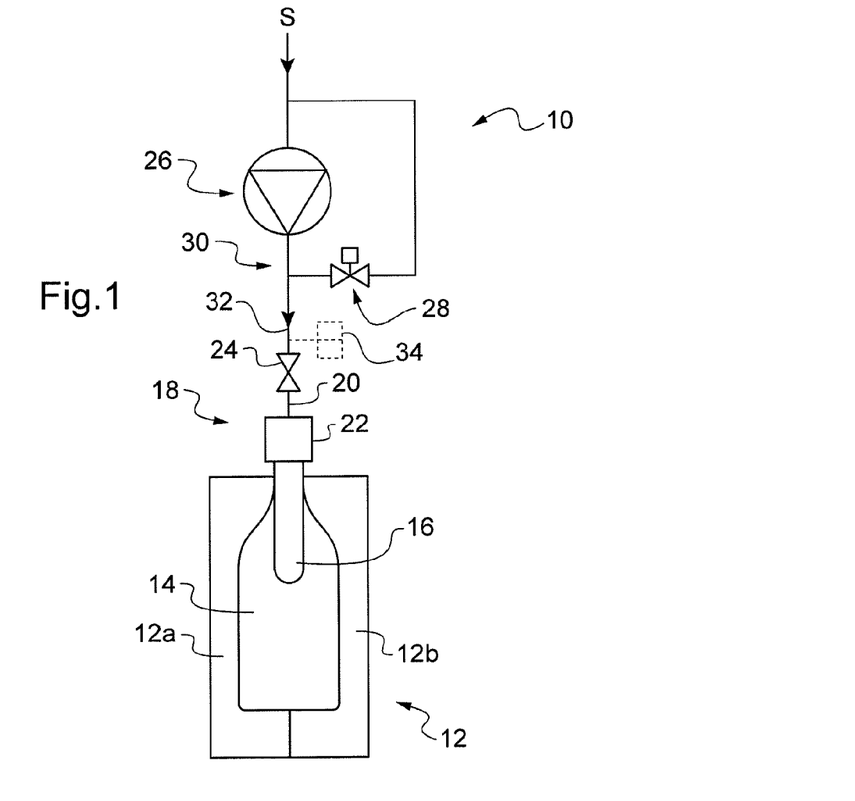
FIG. 1 schematically represents a system for blowing and filling containers according to a first embodiment of the invention.

FIG. 1 schematically represents a system 10 for simultaneously blowing and filling thermoplastic polymer containers according to the invention, such as bottles, from thermoplastic polymer preforms.

This system is particularly suitable for manufacturing lightweight thermoplastic polymer containers.

System 10 comprises a mould 12 for enclosing e.g. a lightweight thermoplastic polymer preform.

Mould 12 is for example a two-part mould of which the two parts 12*a*, 12*b* define an inner cavity 14 when assembled together.

As represented in FIG. 1, a thermoplastic polymer preform 16 is inserted into cavity 14 at the beginning of the blowing and filling process or just before.

The shape of the cavity corresponds to the shape of the achieved container and it will be wholly occupied by the formed container at the end of the blowing and filling process.

Figure 2:
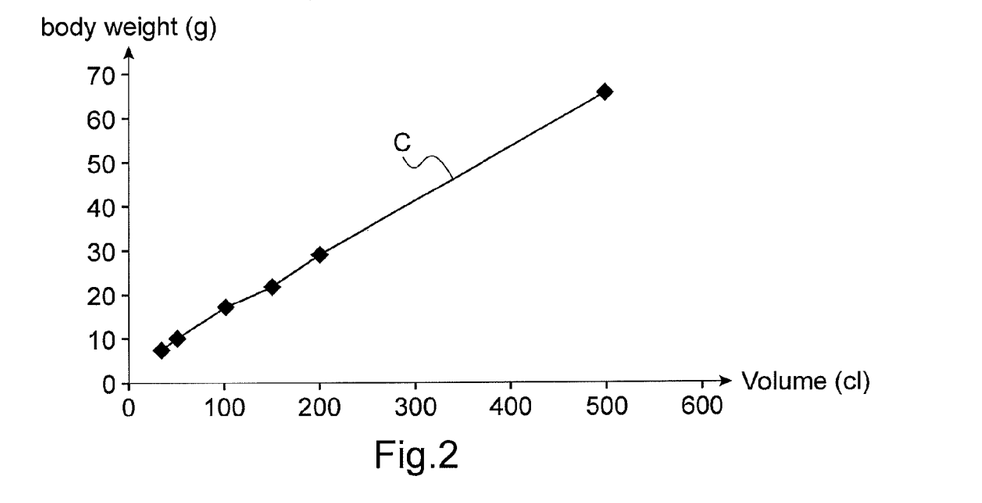
FIG. 2 is a graph representing the weight of a container body as a function of its volume.

Lightweight preforms or containers may be defined with respect to the graph of FIG. 2.

This graph illustrates the weight of a preform or container body expressed in grams (g) as a function of the volume of the latter expressed in centiliters (cl).

The lightweight preforms or containers are located below the curve C. This graph applies to bottles of still water.

The skilled person knows similar graphs that define lightweight containers used for containing other liquids.

In the present embodiment, the container which is being blown and filled is a bottle filled with still water.

However, other containers may be envisaged as well as other liquids.

It is to be noted that mould 12 may alternatively be composed of more than two parts depending on the manufacturing process.

For instance, a third part may be added at the bottom of the mould (base mould) so as to constitute at least a part of the inner cavity bottom.

System 10 further comprises a liquid injection circuit 18 disposed above the mould.

Liquid injection circuit 18 comprises a duct 20 and injection means 22 downstream of duct 20.

Injection means 22 may be an injection head which comes into a sealing contact (for liquid tightness purpose) with preform 16.

The injection head includes an injection nozzle (not represented in the drawing) that is moveable between an injection position allowing liquid to be injected into the preform and a rest position in which the injection nozzle rests against an inner surface of the injection head in a sealing engagement so as to prevent any flow of liquid from the injection head into the preform.

System 10 also comprises stretching means for stretching preform 16 enclosed within mould 12.

Stretching means comprise a stretching rod which is in a sliding connection with the injection nozzle.

Figure 5A:
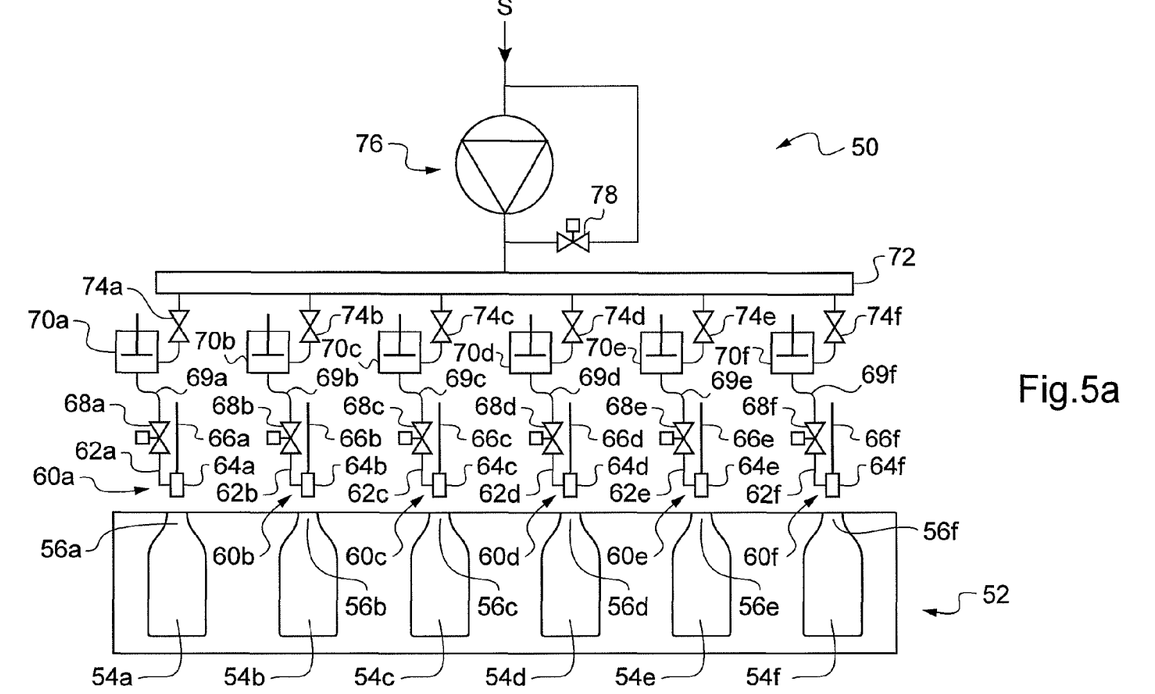
FIGS. 5*a* and 5*b* schematically represent a system for blowing and filling containers according to a third embodiment of the invention.
Figure 6:
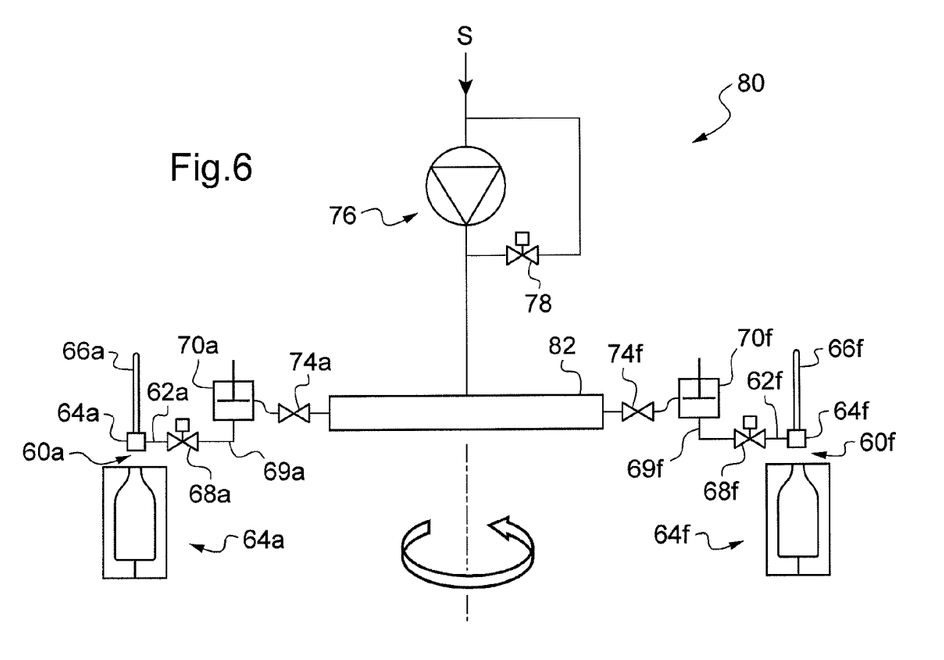
FIG. 6 schematically represents a system for blowing and filling containers according to a fourth embodiment of the invention.

In FIG. 1, the stretching rod is not represented for the sake of clarity. Stretching means are illustrated in FIGS. 5*a* and 6 which will be subsequently described.

The stretching rod of FIG. 1 embodiment is actuated upon command to be inserted into preform 16 so as to stretch the latter while a filling liquid is injected thereinto with a view to causing expansion of said preform within the mould.

Actuating means for actuating the rod have not been represented either for the sake of clarity.

System 10 comprises a valve device 24 that enables flowing of liquid through circuit 18 when opened and prevents liquid from flowing through the valve device and downstream thereof when closed.

Liquid to be injected into the preform is supplied from a source of liquid S which feeds said liquid to a pump device 26 of system 10.

Pump device 26 is located upstream of valve device 24.

Such a pump device is suitable for delivering a constant pressure, e.g. between 3 and 7 bars.

As represented in FIG. 1, a flow valve 28 is mounted in parallel of pump device 26 as a safety valve.

This valve acts as a discharge valve in order to protect the pump device, for instance when the liquid pressure is building up or if there is no bottle being manufactured.

System 10 also comprises a liquid circuit 30 located upstream valve device 24 and that is a liquid supply circuit including pump device 26 and flow valve 28.

Liquid circuit 30 further includes a duct or pipe 32 located between pump device 26 and valve device 24 and connected to the latter.

In the present embodiment, duct or pipe 32 is flexible in that it is elastically deformable.

In the course of performance of a blowing and filling method according to the invention, the stretching means are actuated during a stretching phase whereas valve device 24 is in a closed position, thereby preventing liquid from being injected into preform 16.

Thanks to pump device 26, liquid is being brought to a predetermined pressure P1 above the atmospheric pressure. This can be seen as pre-load in the liquid circuit upstream of liquid injection circuit 18 and valve device 24.

Thus, the liquid that is at rest upstream of valve device 24 (before the injection phase starts) is already "pre-loaded" at the above-mentioned predetermined pressure.

It is to be noted that the liquid may be pressurized before the stretching phase starts or at the beginning thereof or even after the latter.

When the pressure of the liquid is being brought to a predetermined pressure above the atmospheric pressure thanks to pump device 26 (or any other device fulfilling the same function) the energy produced through pressurizing the liquid causes deformation of duct 32. When swelling or inflating the duct stores energy and remains swelled or inflated due to the presence of the pressurized liquid within the duct.

The length of the duct, its thickness, the material used for its constitution are adapted to the amount of energy that is to be stored.

Any other device capable of being elastically deformed under liquid pressure may be used alternatively or in combination with deformable duct 32.

For instance, an expansion tank 34 connected to duct 32 (either flexible or not) may be used.

Also, air may be injected into the supply circuit so as to store energy when the liquid is being pressurized and air is compressed.

After a predetermined period of time, the injection phase starts for injecting the liquid into the preform.

The injection phase starts with the opening of valve device 24. Actuation of valve device 24 may be controlled through a processor or a computer or may be manual.

Before the start of the injection phase, the liquid is at rest and under a predetermined pressure and energy is stored thanks to at least one of the above-described means/devices. The liquid is then released through the opening of valve device 24, at the start of the injection phase. It flows into duct 20 being propelled by the stored energy that has been released/recovered through the valve device opening. The powered liquid then flows into injection means 22 (injection nozzle is actuated to occupy the injected position) and preform 16 with a greater pressure and velocity than in the prior art.

This speeds up the injection phase in that the liquid is more quickly introduced into the lightweight preform 16 which is simultaneously being stretched.

This faster injection of liquid during the stretching phase enables better control of the expansion of the preform and avoids breakage thereof.

Figure 3:
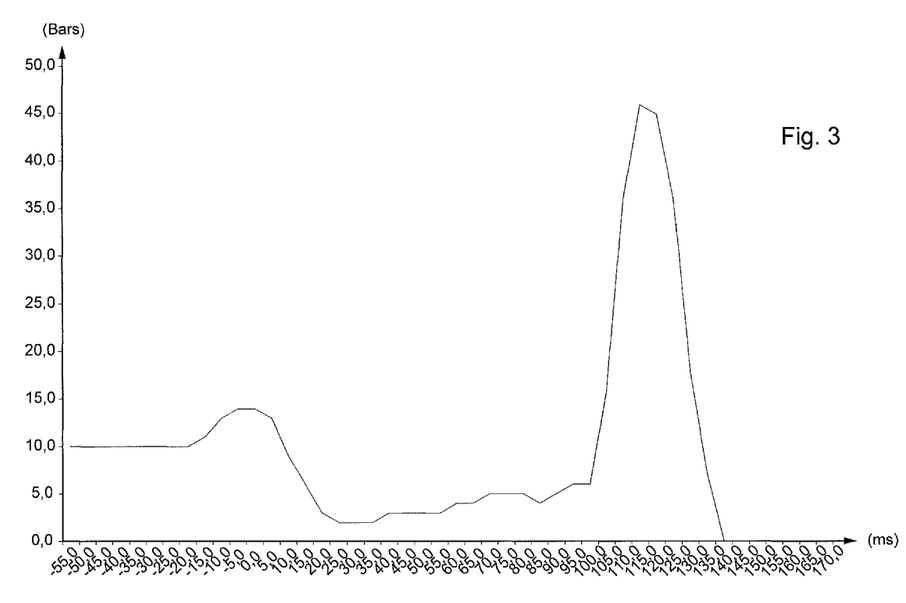
FIG. 3 represents the variation in pressure of the liquid injected into a preform as a function of time.

FIG. 3 illustrates the variation in the pressure of liquid before, during and after the injection phase as a function of time.

As represented in FIG. 3, the pressure of the liquid before the opening of valve device 24 is constant and equal to the predetermined pressure P1.

At time t1, valve device 24 is commanded to be opened so as to release the liquid accumulated upstream of said valve device, as well as the stored energy which pushes/powers the pressurized liquid downstream.

The injection phase therefore starts and liquid pressure suddenly decreases before rapidly increasing. Liquid flows through liquid injection circuit 18 and into preform 16 for filling thereof.

Filling of preform 16 while it is stretched corresponds to the phase illustrated in FIG. 3 within time interval t1-t2.

At time t2 stretching and filling of the container have been achieved.

From time t2 further pressure is applied to the liquid as represented by the peak in pressure so as to increase the liquid pressure within the container.

This increase in pressure makes it possible to ensure that the formed container will perfectly spouse the inner walls of mould cavity 14.

This will make it possible to obtain a container (e.g. a bottle) with detailed relief and finished outside surface such as corrugations, etc.

For instance, the pressure may amount to 35-40 bars during this last step (time interval t2-t3).

The final increase in pressure may be obtained thanks to flow valve 28. The more flow valve 28 is closed, the greater the increase in pressure.

According to the above-described blowing and filling method it is therefore possible to manufacture lightweight containers such as defined by the graph of FIG. 2 while dramatically reducing the risk of damaging these containers.

Figure 4:
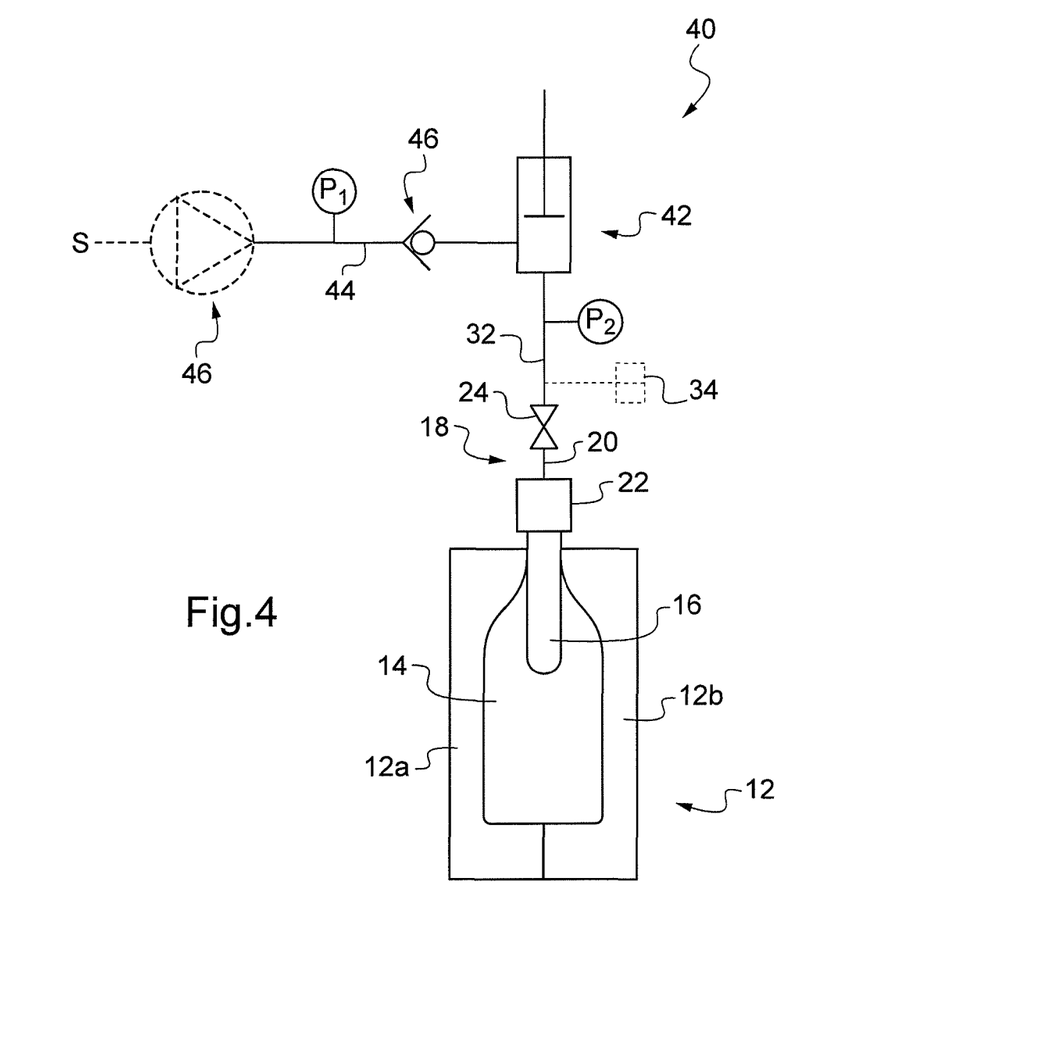
FIG. 4 schematically represents a system for blowing and filling containers according to a second embodiment of the invention.

FIG. 4 illustrates a second embodiment of a system 40 for blowing and filling thermoplastic containers according to the invention.

As has been already described with reference to FIG. 1, system 40 comprises a mould 12 for enclosing lightweight preform 16 and an injection liquid circuit 18 for injecting liquid into the preform.

Valve device 24 is located upstream of circuit 18.

Also, system 40 comprises flexible or elastically-deformable duct 32 and/or expansion tank 34 (and/or air added to the liquid) in a variant embodiment.

As for FIG. 1 system, these means/devices store energy that is being created when increasing the pressure of the liquid within duct 32.

System 40 further comprises upstream of valve device 24 a piston device 42 which is able to pressurize a liquid supplied by a source S through a supply line 44 connected to piston device 42 upstream thereof.

Supply line 44 also includes a non return valve 46 so as to prevent any return of liquid from piston device 42 to liquid source S.

As represented in FIG. 4, liquid is supplied under a predetermined pressure P1 to piston device 42.

As represented in dotted lines, system 40 may further comprise a pump device 46 that is similar to pump device 26 of FIG. 1.

Pump device 46 behaves as pump device 26 and supplies pressurized liquid coming from a source of liquid S to supply line 44 and piston device 42 connected thereto.

It is to be noted that any kind of device which is able to displace a predetermined volume of liquid such as water may be used for pre-loading the liquid circuit upstream of valve device 24.

In this embodiment, pump device 46 or any other alternative device that is able to bring the pressure of the liquid to pressure P1 (before operating the injection phase) is responsible for providing the liquid pressure that is necessary for injecting the liquid into the preform (during the injection phase).

The time-based pressure variation curve of FIG. 3 still applies to FIG. 4 system.

At time t1, valve device 24 is actuated to be opened in order to start the injection phase whereas the stretching phase has already started.

The pressurized liquid is therefore released and the stored energy is recovered through opening the valve device.

The liquid is then pushed through and downstream valve device 24 under the action of the released energy. The description is identical to that already made with reference to both FIGS. 1 and 3.

After time t2 an increase in the liquid pressure is generated by the FIG. 4 system as for FIG. 1 system in order to confer appropriate printing and relief details on the outside surface of the container.

However, this increase in pressure is achieved in FIG. 4 system thanks to the actuation of piston device 42 which, therefore, further pressurizes the liquid that is present within the liquid circuit downstream said piston device.

In an alternative operating mode, pump device 46 or any other alternative device that is able to increase the pressure of the liquid to pressure P1 supplies the pressurized liquid to piston device 42 so as to fill it.

Next, piston device 42 takes care of the pressure management throughout the whole process, that is ensuring the maintenance of pressure P1 before the injection phase starts and providing the pressure to the liquid during and after the injection phase.

As for the FIG. 1 first embodiment, stretching means which are simultaneously stretching preform 16 while liquid is being injected thereinto are not represented in FIG. 4 for the sake of clarity.

As for system 10, system 40 enables blowing and filling of lightweight thermoplastic containers while dramatically reducing the risk of damaging the latter.

FIG. 5a illustrates a third embodiment of a system 50 for blowing and filling thermoplastic containers, e.g. lightweight containers, according to the invention.

System 50 comprises a mould 52 which may be a two-part mould, each part having the longitudinal shape represented in FIG. 5a.

Figure 5B:
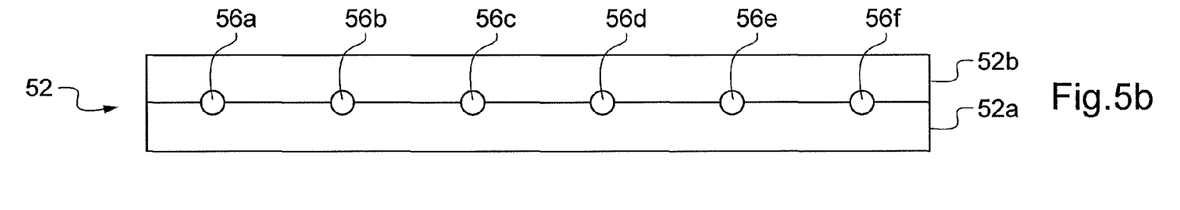

FIG. 5b schematically represents the two parts 52a, 52b of mould 52 viewed from above.

The parts 52a and 52b define together when assembled a plurality of cavities 54a-f which are similar to cavity 14 of FIGS. 1 and 4.

As represented in FIGS. 5a and 5b, each cavity has a top opening 56a-f from which the upper portion of a corresponding preform protrudes when placed within the corresponding cavity.

For the sake of clarity, the plurality of thermoplastic polymer preforms placed within each cavity 54a-f have not been represented.

Each preform is identical to preform 16 in FIGS. 1 and 4. The two parts 52a, 52b of mould 52 are opened and closed upon command depending on the step of the blowing and filling process.

System 50 comprises a plurality of liquid injection circuits 60a-f, each comprising a duct 62a-f and injection means 64a-f such as an injection head.

Stretching means represented under the form of a stretch rod 66a-f cooperate each with each injection means 64a-f in a known manner during the simultaneous blowing and filling process.

As represented in FIG. 5a, the liquid injection circuit and the associated stretching means are located above mould 52 and the enclosed preforms.

A plurality of valve devices 68a-f are provided each in the liquid circuit upstream of each liquid injection circuit 60a-f.

These valve devices are controlled to be opened or closed in accordance with a given step or phase of the process.

By default, these valve devices are commanded to be in a closed state and are commanded to be opened when the injection phase starts.

System 50 also comprises a plurality of piston devices 70a-f located upstream of valve devices 68a-f respectively, these piston devices perform each the same function as that of piston device 42 in FIG. 4.

System 50 further comprises a flexible/elastically-deformable means/device in order to store energy generated when pressurizing the liquid before the injection phase starts.

In this respect, the ducts or pipes 69a-f that respectively extend between piston devices 70a-f and valve devices 68a-f may be flexible or elastically-deformable in whole or in part. Other means or devices as previously described may also be used alone or in combination therewith.

It is to be noted that each of the plurality of circuits comprising each a piston device, an elastically-deformable device, a valve device, and a liquid injection circuit (downstream duct and injection means) is identical to the corresponding circuit in FIG. 4 and operates in the same way.

System 50 further comprises a liquid distributing unit or manifold 72 which is disposed upstream of the plurality of piston devices 70a-f and connected thereto through respective valves 74a-f.

These valves are for instance proportional valves which allow the flow of liquid to be accurately controlled.

More particularly, manifold 72 comprises several outlets connected downstream to the respective valves 74a-f and a common inlet that is connected upstream to a pump device 76. Pump device 76 is the same as pump device 26 of FIG. 1 and pump device 46 of FIG. 4.

Safety valve 77 is mounted in parallel to pump device 76 and has the same role as valve 28 in FIG. 1.

The combination of pump device 76 and the plurality of piston devices 70a-f makes it possible to simultaneously blow and fill a plurality of thermoplastic polymer containers, e.g. lightweight containers, according to the invention. Both types of devices operate in the same way as that described with reference to FIG. 4.

The variation in pressure upstream of valve devices 68a-f is similar to that represented in FIG. 3 for the FIGS. 1 and 4 systems.

It is to be noted that any device that is capable of displacing a predefined volume of liquid may be used in the FIG. 5a configuration instead of piston devices 70a-f.

FIG. 6 illustrates a fourth embodiment of a system 80 for blowing and filling a plurality of thermoplastic polymer containers, e.g. lightweight containers, according to the invention.

System 80 of FIG. 6 differs from system 50 of FIG. 5a in that it comprises a rotating manifold 82.

Pump device 76 and its possible associated safety valve 78 are located upstream of manifold 82 and connected thereto through a manifold inlet.

Pump device 76 may be in a fixed position or may rotate together with manifold 82.

Pump device 76 may be centrally located so as to provide a more compact design for the whole system.

This arrangement is also easier to conceive since the pump device is centered around the rotating axis of the system.

As represented in FIG. 6, pump device 76 is located above manifold 82 but other alternative arrangements may be envisaged according to different constraints such as the space available for the system etc.

Rotating manifold 82 is connected to a plurality of rotating stations through several peripheral outlets.

The rotating stations are disposed in a peripheral manner around manifold 82 and comprise the same components as those illustrated in FIG. 6a.

Thus, each station has a liquid injection circuit or unit 60a-f located above a mould 84a that is identical to mould 12 in FIGS. 1 and 4.

Each station further includes a liquid injection circuit made of a duct 62a-f and injection means 64a-f (injection head) and stretching means (stretch rod) 66a-f are connected to injection means 64a-f so as to cooperate therewith during the simultaneous blowing and filling process.

Each station further comprises a valve device 68a-f upstream of liquid injection circuit 60a-f and an elastically-deformable duct or pipe 69a-f upstream of the valve device. An expansion bottle or tank (not represented) may also, or alternatively, be used.

The station also comprises a piston device 70a-f located upstream of duct 69a-f and valve device 68a-f as well as an associated upstream valve 74a-f which is located downstream of a corresponding manifold outlet.

The whole connection between each station and the manifold rotates together with these components.

Liquid to be injected into each preform (not represented) that has been placed within a corresponding mould of the plurality of stations is supplied from a source of liquid S and pressurized through pump device 76 which supplies pressurized liquid to rotating manifold 82.

The method of simultaneously blowing and filling a plurality of thermoplastic polymer containers, e.g. lightweight containers, according to the invention is implemented through system 80.

The method is the same as that already described with reference to the previous Figures.

In particular, the different arrangements of systems 50 and 80 make it possible to pre-load the circuits upstream of closed valve devices 68a-f so that the liquid at rest that is located upstream of these valve devices is already pressurized to a predetermined pressure above the atmospheric pressure.

Also, energy that has been produced when increasing the liquid pressure is stored upstream of the closed valve devices through the above-described means/devices.

When the valve devices are commanded to be opened through a controlled process (e.g. under the control of a computer or a processor which may be remotely located) the variation in the pressure upstream of the valve devices has the same variation as that illustrated in FIG. 3.

Containers such as bottles and, in particular, bottles filled with water, in particular lightweight containers, may therefore be obtained according to the systems and method of the invention.

The invention claimed is:

1. A method of blowing and filling a container from a thermoplastic polymer preform, comprising:
   stretching a thermoplastic polymer preform that is placed within a mold during a stretching phase;
   injecting a liquid into the preform, the injection of the liquid starting after the stretching of the preform has started; and
   prior to starting the injection of the liquid, the liquid is at a predetermined pressure above atmospheric pressure.

2. The method according to claim 1, comprising prior to starting the injection phase, bringing the liquid to the predetermined pressure above atmospheric pressure.

3. The method according to claim 2, comprising a step of storing energy produced when bringing the liquid to the predetermined pressure above the atmospheric pressure.

4. The method according to claim 3, wherein the injection phase is powered in part by the stored energy that is released when starting the injection phase.

5. The method according to claim 3, wherein, when starting the injection phase, the pressurized liquid is pushed for being injected into the preform due to the release of the stored energy.

6. The method according to claim 1, wherein the predetermined pressure is greater than 0 and less than or equal to 40 bars.

7. The method according to claim 1, comprising opening a valve device in a liquid injection circuit so as to release the pressurized liquid in the circuit and enable its injection into the preform, the pressurized liquid being at the predetermined pressure upstream of the valve device before its opening.

8. A system for blowing and filling a container from a thermoplastic polymer preform with a liquid, the system comprising:
   a mold for enclosing a thermoplastic polymer perform;
   a stretching member for stretching a thermoplastic polymer preform placed within the mold;
   an injector for injecting a liquid into the preform, the injector being in a closed position;
   a liquid is a predetermined pressure above atmospheric pressure located within the injector while the injector is in the closed position.

9. The system according to claim 8, which comprises a member for bringing the liquid to the predetermined pressure above atmospheric pressure.

10. The system according to claim 9, wherein the member for bringing the liquid to the predetermined pressure above atmospheric pressure comprises a device selected from the group consisting of: a piston/cylinder device; and a pump device.

11. The system according to claim 10, wherein the member for bringing the liquid to the predetermined pressure above atmospheric pressure comprise a piston/cylinder device and a pump device connected thereto.

12. The system according to claim 9, comprising an energy storage device for storing energy produced when bringing the liquid to the predetermined pressure above the atmospheric pressure.

13. The system according to claim 12, wherein the energy storing device comprise at least one of the following in the liquid circuit in which the liquid is brought to the predetermined pressure: presence of air; and at least one deformable part that is elastically-deformable when submitted to the predetermined pressure so as to store energy.

14. The system according to claim 12, comprising means for releasing the stored energy which are activated to release the latter when the injector is caused to inject the pressurized liquid into the preform.

15. The system according to claim 8, comprising: a liquid injection circuit for injecting the liquid into the preform; and a valve device that is located upstream of the liquid injection circuit, the valve device enabling holding of the liquid at the predetermined pressure above the atmospheric pressure and ready to be injected when closed, and, release of the pressurized liquid in the liquid injection circuit for injection into the preform when open.

* * * * *